Feb. 4, 1969 D. M. SWALLOW 3,425,554
MEANS FOR IMPROVING PERFORMANCE OF SEPARATOR SCREENS
Original Filed Aug. 27, 1963 Sheet 1 of 2

INVENTOR.
DOUGLAS M. SWALLOW
BY
ATTORNEYS

United States Patent Office 3,425,554
Patented Feb. 4, 1969

3,425,554
MEANS FOR IMPROVING PERFORMANCE OF SEPARATOR SCREENS
Douglas M. Swallow, Burlington, Ontario, Canada, assignor to Southwestern Engineering Company, Los Angeles, Calif., a corporation of California
Continuation of application Ser. No. 304,833, Aug. 27, 1963. This application Dec. 12, 1966, Ser. No. 601,212
U.S. Cl. 209—323             13 Claims
Int. Cl. B07b 1/28

ABSTRACT OF THE DISCLOSURE

A vibratory separator, including circular spacer shells, at least one circular separator screen with a connector pan underneath the screen, all secured together as a unit, springs supporting the unit, and mechanism for imparting high frequency vibrations to the unit, a structure incorporated in the unit defining a closed annular chamber concentric with the screen, and impact producing means consisting of a plurality of elements shaped to move freely in the chamber, the elements being energized by the vibration producing mechanism to engage the walls of the chamber.

---

This application is a continuation of applicant's prior copending application Serial No. 304,833 filed Aug. 27th, 1963, and now abondoned.

This invention relates to means for improving the performance of separator screens; more particularly to a means for increasing the "through-put" efficiency of separator screens subjected to high frequency vibration.

Included in the objects of this invention are:

First, to provide a means for improving the performance of separator screens subjected to rhythmic vibration impulses wherein the separator screen is additionally subjected to random impact impulses without impact engagement with the screen itself.

Second, to provide a means of this type which includes a structure defining a closed, annular chamber and impact elements freely movable within the chamber to engage the walls thereof, so as to subject the separator, and especially the separator screen, to random impact impulses.

Third, to provide means for subjecting vibrating separator screens to additional random vibrations which are incorporated in a hollow, annular, tensioning ring forming a part of the screen structure.

Fourth, to provide a means of this character wherein the hollow, annular chamber is rigidly attached to a structural element of the separator such as a shell surrounding a screen or the diverter pan disposed between or below a screen.

Fifth, to provide a means of this character wherein the vibrating elements may be hardened metal pellets or spheres, or in some cases may comprise one or more metal rings loosely received in the annular chamber or chambers, for precession therein during vibration of the machine.

With the above and other objects in view, as may appear hereinafter, reference is directed to the accompanying drawings in which.

Figure 3:
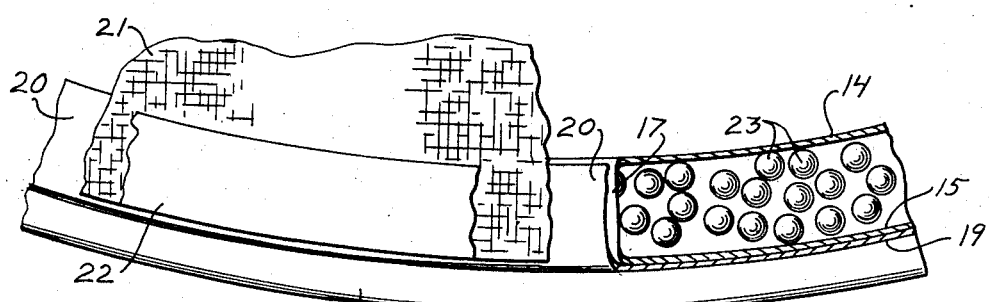
FIGURE 3 is a fragmentary, sectional view thereof taken through 3—3 of FIGURE 2 with portions in elevation.

The type of separator with which the present invention is concerned is uniquely arranged for use with and more fully shown in patent to Robert J. McCausland, No. 3,035,700, for Shaking Apparatus, issued May 22, 1962, and in patent to Howard W. Wright, Jr., et al., No. 3,029,946, for Clamping Means for Material Separators, issued Apr. 17, 1962.

This type of separator includes a base structure 1 on which is supported a separator assembly 2 by means of a ring of springs 3. The separator assembly 2 includes a stacked series of cylindrical shells 4 having outturned flanges 5. The flanges 5 receive therebetween the margins of a series of separator screen units 6 supported within resilient mounting and sealing rings 7 which are held together by clamp rings 8. At the bottom of the separator assembly 2 there is mounted a motor 9 having eccentric weights 10 and 11 at opposite ends. The above-described structure may be considered as conventional.

Figure 2:
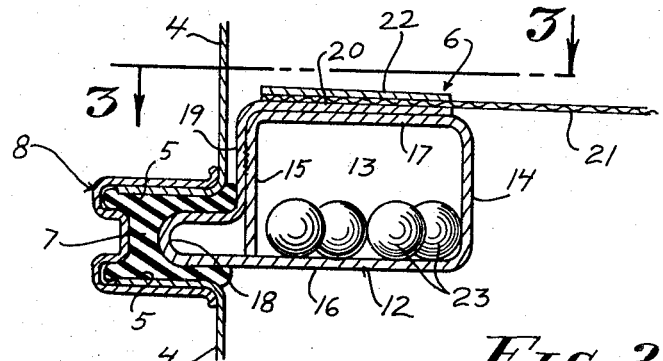
FIGURE 2 is an enlarged, fragmentary, sectional view taken through 2—2 of FIGURE 1, showing a margin of the separator screen and one form of impact-producing means for improving performance thereof.
Figure 1:
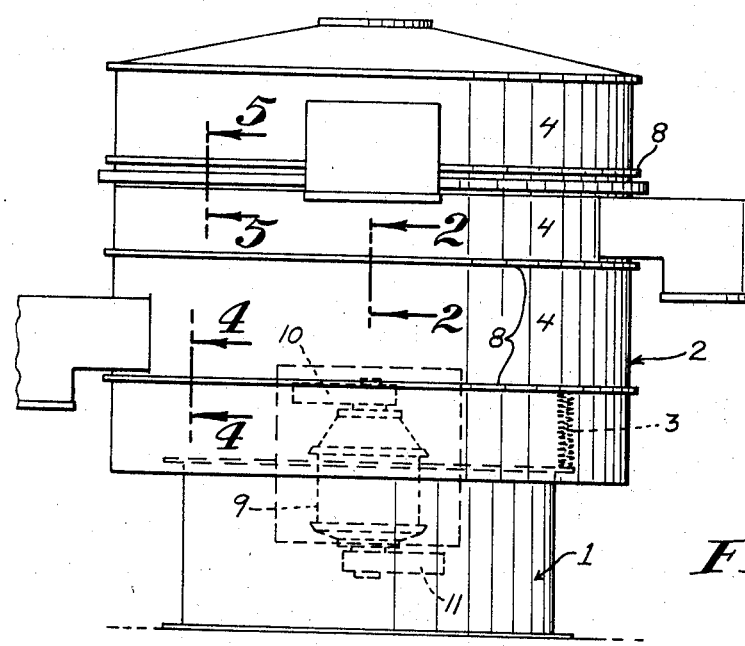
FIGURE 1 is a substantially diagrammatical, side view of a vibration-type separator structure adapted to employ various forms of the present invention.

Reference is first directed to FIGURES 2 and 3. In the exercise of the invention as here illustrated, the separator screen unit 6 is provided with a special tension ring or annular frame 12 formed of sheet metal. The annular frame 12 is formed by folding a sheet metal blank to form an essentially rectangular chamber 13 having a radially inner wall 14, a radially outer wall 15, a bottom wall 16, and a top wall 17.

The bottom wall 16 extends radially outward beyond the radially outer wall 15, and is folded upon itself to form an annular lip 18; and then extends upwardly to form a reinforcing outer wall 19 overlying the outer wall 15 and a reinforcing top wall 20 overlying the top wall 17. The reinforcing walls 19 and 20 are bonded to the underlying walls by spot welding, or the like.

The outer margin of a circular screen 21 overlies the reinforcing top wall 20, and is in turn covered by a ring 22. The screen 21 and ring 22 are spot welded or otherwise secured to the annular frame 12.

The sealing ring 7 is essentially U-shaped in cross section, and the lip 18 fits between the flanges 5 thereof, as shown best in FIGURE 2, so that the annular frame 12 is resiliently supported.

The annular chamber 13 is partially filled with a plurality of impact elements 23 which may be spherical.

Operation of the separator screen is as follows:

When the separator structure is in operation, the eccentric weights 10 and 11 cause the separator assembly 2 to vibrate as a unit. The nature of the vibration may be varied by the relative circumferential location as well as the relative mass of the eccentric weights 10 and 11, as is well known in the vibrating type of separator.

The vibration is imparted to the separator screen and to the annular frame 12. Such vibration causes the impact elements or balls 23 to strike the walls of the chamber 13 in a random manner so as to set up additional vibrations in the separator screen.

Figure 4:
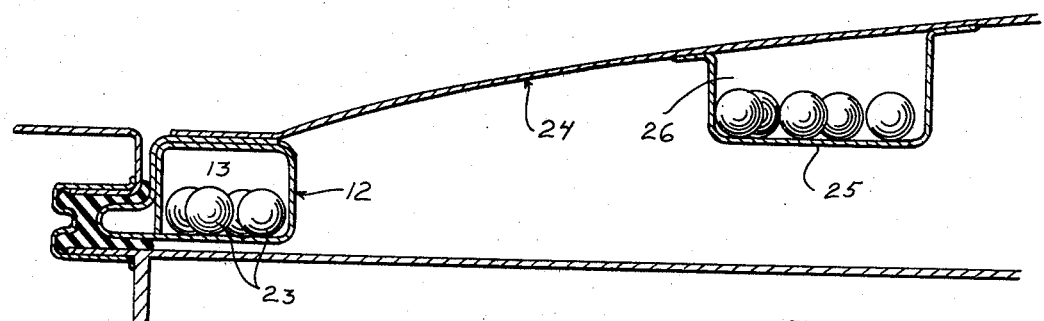
FIGURE 4 is a fragmentary, sectional view taken through 4—4 of FIGURE 1, showing two modified forms of the impact-producing means incorporated within the rim of a diverter pan and under a selected annulus within the boundaries thereof.

Reference is now directed to FIGURE 4, which illustrates a diverter pan 24 attached to an annular frame 12, corresponding to the screen-tensioning frame, and containing impact elements 23. The effect of the frame 12 and impact elements 23, when so mounted, is essentially the same as when attached to the screen itself except that the impact is less efficiently applied, due to the fact that the impulses must be transmitted to the screen through portions of the separator structure. This loss can be minimized by the use of impact elements of greater mass or number.

Also illustrated in FIGURE 4 is a further modification wherein an annular channel 25 is welded to the underside of the pan 24. In this case the resulting chamber 26 may be larger than that conveniently provided in the frame 12, and therefore contains more and larger impact elements 23.

Figure 5:
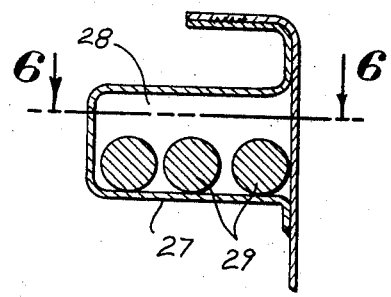
FIGURE 5 is a fragmentary, sectional view taken through 5—5 of FIGURE 1, showing a further modification of the impact-producing means.
Figure 6:
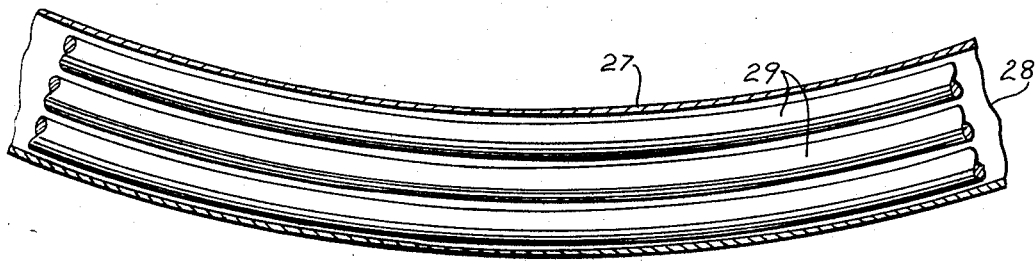
FIGURE 6 is a fragmentary, sectional view taken through 6—6 of FIGURE 5.

Reference is now directed to FIGURES 5 and 6. In this case a channel-shaped structure 27 is welded to the exterior of one of the shells 4 to form an annular chamber 28. In this case the chamber 28 is shown as provided with impact elements in the form of annular rings 29.

It should be understood that the impact element 23 and impact rings 29 are interchangeable. Also the elements 23 may be in the form of short cylinders or otherwise shaped.

It has been found highly desireable that the impact chambers be annular, and that the impact elements be free to precess about the separator while the separator vibrates, otherwise the forces are not evenly distributed.

It will be observed that, with each of the arrangements illustrated or suggested, the impulses resulting from the impact elements are, in fact, multiple, irregular, and nonplanar, and have high frequency.

While the present invention in each of the embodiments illustrated is particularly effective to minimize "blinding" of the separator screen, the invention has far wider application. That is, exercise of the invention materially increases "through-put" when screening substances which do not present a blinding problem.

Because of the multiple, irregular or random, nonplanar, and high frequency impulses, the particles are quickly presented to the screen to pass through if of appropriate size, or to pass over if too large. Stated otherwise, "floating" of the particles is minimized.

Also, as distinguished from conventional ball trays placed under the screens, mechanical wear and damage by contact of the balls with the screen is eliminated, and also eliminated is the mutual contact between the balls and the product. It has been the conventional practice to use balls formed of elastomers to minimize damage to the screens; but this has placed a severe restriction of the impulse forces which may be imparted, as well as, in some cases, causing contamination of the product. Still further, the use of rubber balls, or the like, limits severely the temperatures which may be tolerated.

While particular embodiments of this invention have been shown and described, it is not intended to limit the same to the exact details of the constructions set forth, and it embraces such changes, modifications, and equivalents of the parts and their formation and arrangement as come within the purview of the appended claims.

What is claimed is:

1. In a vibratory separator, including circular spacer shells, at least one circular separator screen and a collector pan thereunder, all secured together as a unit, springs supporting said unit, and a mechanism for imparting high frequency vibrations to said unit, the improvement which comprises:
   (a) a structure incorporated in said unit and defining a closed and continuous annular chamber concentric with said screen;
   (b) an impact-producing means within said chamber and comprising a plurality of elements dimensioned and shaped to move freely in said chamber around the entire periphery thereof and energized by said mechanism to engage the walls of said chamber, said chamber maintaining said impact-producing means out of direct contact with said screen.

2. The combination of claim 1, wherein said structure is secured under said collector pan.

3. The combination of claim 1, wherein said impact producing means further comprises a plurality of spherical elements.

4. A separator structure, comprising:
   (a) at least a pair of shell members having confronting flanges;
   (b) hollow tension frame including a lip;
   (c)) resilient means yieldable supporting said lip between said flanges;
   (d) a retainer clamp embracing said flanges;
   (e) a screen supported in tension by said tension frame;
   (f) means for subjecting said shell member, tension frame, and screen to high-frequency vibration;
   (g) and impact means comprising a plurality of elements dimensioned and shaped to move freely and confined within said hollow tension frame around the entire periphery thereof, and responsive to said vibration means to vibrate said tension frame and screen relative to said shell members.

5. The separator structure of claim 4 wherein said impact means comprises a plurality of spherical elements.

6. A separator structure, comprising
   (a) at least a pair of annular shell members;
   (b) a circular screen peripherally supported between said shell members;
   (c) a collector pan below said screen;
   (d) springs supporting said shells, screen and pan as a unit;
   (e) a mechanism for imparting essentially uniform, high-frequency vibrations to said unit;
   (f) means incorporated in said unit defining at least one closed and continuous annular chamber concentric with said screen;
   (g) an impact-producing means sealed within said chamber to produce random, high-frequency impacts against the walls of said chamber, for transmission of vibrations to said screen algebraically added to those vibrations produced by said mechanism, said impact producing means comprising a plurality of elements dimensioned and shaped to move freely within said chamber around the entire periphery thereof and said chamber maintaining said impact-producing means out of direct contact with said screen.

7. A separator as set forth in claim 6 wherein said chamber-defining means include one of said shells and an annular wall-forming member joined to the exterior of said shell.

8. A separator as set forth in claim 6 wherein said chamber-defining means includes said pan and an annular wall-forming member joined to the underside thereof.

9. A separator as set forth in claim 6 wherein said chamber-defining means is a hollow, annular frame secured to the periphery of said pan.

10. The separator structure of claim 6 wherein said impact means comprises a plurality of spherical elements.

11. In a vibratory separator, including circular spacer shells, at least one circular separator screen and a collector pan thereunder, all secured together as a unit, springs supporting said unit, and a mechanism for imparting high frequency vibrations to said unit, the improvement which comprises:
   (a) a structure incorporated in said unit and defining a closed annular chamber concentric with said screen, said structure being a hollow, annular tension frame secured to the periphery of said screen;
   (b) and impact-producing means comprising a plurality of elements dimensioned and shaped to move freely in said chamber around the entire periphery thereof and energized by said mechanism to engage the walls of said chamber.

12. In a vibratory separator, including circular spacer shells, at least one circular separator screen and a collector pan thereunder, all secured together as a unit, springs supporting said unit, and a mechanism for imparting high frequency vibrations to said unit, the improvement which comprises:
(a) a structure incorporated in said unit and defining a closed annular chamber concentric with said screen, said structure being secured externally to one of said spacer shells;
(b) and impact-producing means comprising a plurality of elements dimensioned and shaped to move freely in said chamber around the entire periphery thereof and energized by said mechanism to engage the walls of said chamber.

13. A separator structure, comprising:
(a) at least a pair of annular shell members;
(b) a circular screen peripherally supported between said shell members;
(c) a collector pan below said screen;
(d) springs supporting said shells, screen and pan as a unit;
(e) a mechanism for imparting essentially uniform high-frequency vibrations to said unit;
(f) means incorporated in said unit defining at least one closed annular chamber concentric with said screen, said means being a hollow, annular, tension frame secured to the periphery of said screen;
(g) and impact-producing means sealed within said chamber to produce random, high-frequency impacts against the walls of said chamber, for transmission of vibrations to said screen algebraically added to those vibrations produced by said mechanism, said impact producing means comprising a plurality of elements dimensioned and shaped to move freely within said chamber around the entire pheriphery thereof.

References Cited

UNITED STATES PATENTS

| 755,445 | 3/7904 | Burner | 209—382 |
| 2,676,706 | 3/1959 | Temple | 209—332 X |
| 3,035,700 | 5/1962 | McCausland | 209—332 X |

FOREIGN PATENTS

| 423,182 | 7/1924 | Germany. |
| 174,591 | 1923 | Great Britain. |
| 492,917 | 9/1938 | Great Britain. |

HARRY B. THORNTON, *Primary Examiner.*

R. HALPER, *Assistant Examiner.*

U.S. Cl. X.R.

209—332, 382